United States Patent

Marshall et al.

[15] 3,657,826
[45] Apr. 25, 1972

[54] SEMICONDUCTOR LASER MARKSMANSHIP TRAINING DEVICE

[72] Inventors: Albert H. Marshall, Maitland; George A. Siragusa, Winter Park, both of Fla.

[73] Assignee: The United States of America as represented by the Secretary of the Navy

[22] Filed: May 25, 1970

[21] Appl. No.: 40,072

[52] U.S. Cl. ............................................................35/25
[51] Int. Cl. .........................................................F41g 3/26
[58] Field of Search ..................35/25; 250/299; 331/94.5; 273/101.1

[56] References Cited

UNITED STATES PATENTS

| | | | |
|---|---|---|---|
| 3,478,278 | 11/1969 | Muncheryan | 331/94.5 |
| 3,447,033 | 5/1969 | Redmond et al | 35/25 |
| 3,417,237 | 12/1968 | Fenton | 273/101.1 |
| 3,492,742 | 2/1970 | Aldrich et al | 35/25 |

OTHER PUBLICATIONS

The Microwave Journal, Feb. 1966, pages 33, 34, 37, " An Experimental Infrared Radar"

Primary Examiner—Robert W. Michell
Assistant Examiner—J. H. Wolff
Attorney—Richard S. Sciascia, John W. Pease and John F. Miller

[57] ABSTRACT

A marksmanship training device using low-power low-cost semiconductor laser diodes in a simulated weapon for safe marksmanship training. The laser beam intensities developed are such that there is no possibility of eye injury to users. The rate of fire and firing periods as well as the beam area of the simulated weapon can be adjusted to simulate the characteristics of any weapon. Lightweight solid state circuitry is used. A laser beam responsive indicating target is provided.

7 Claims, 4 Drawing Figures

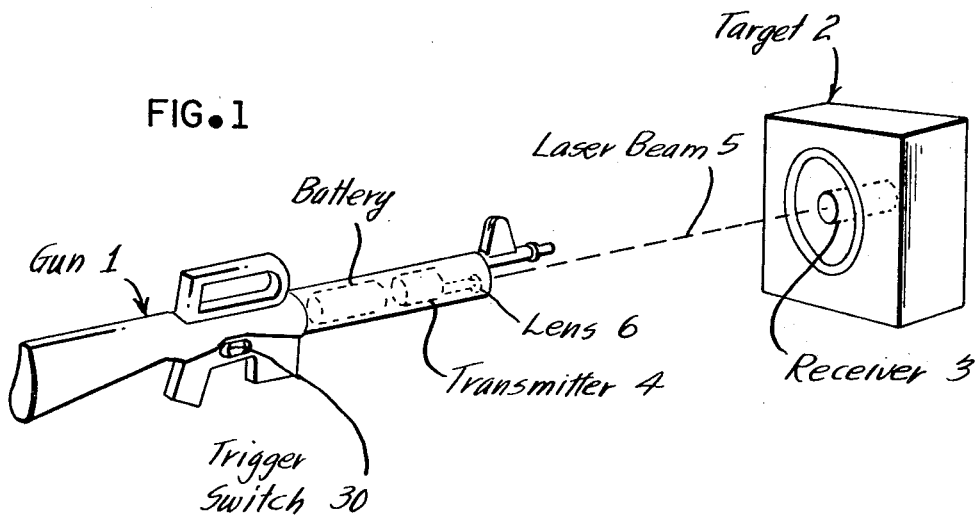
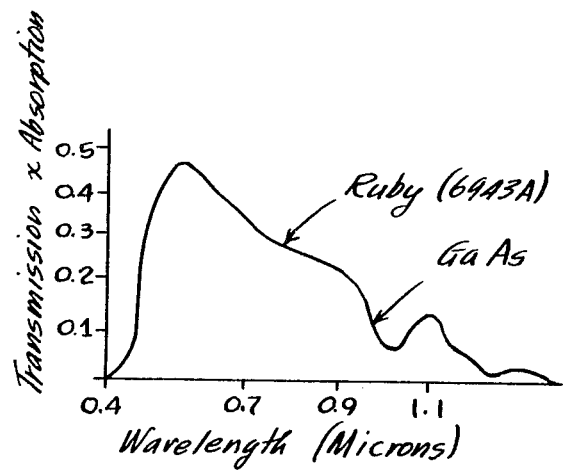

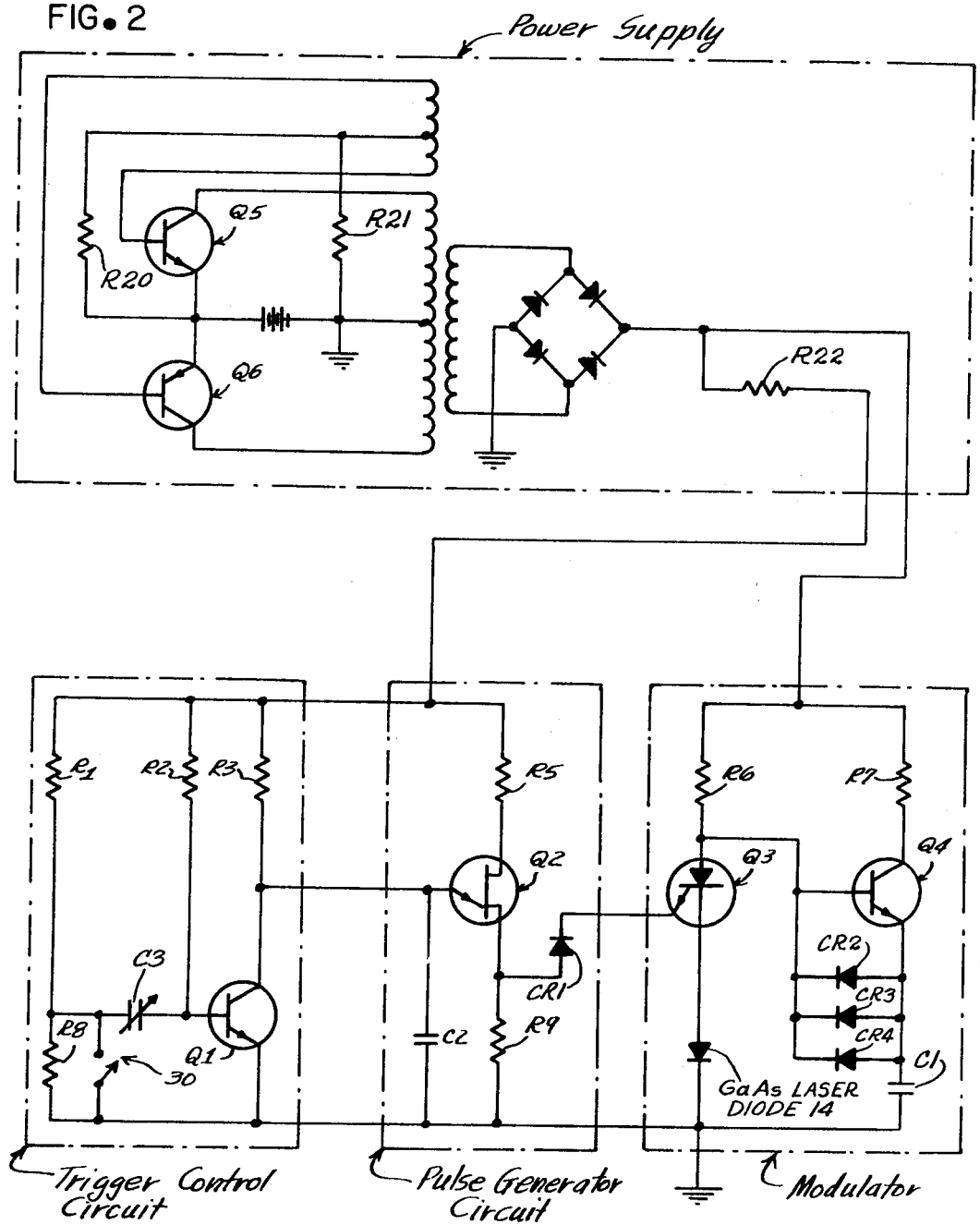

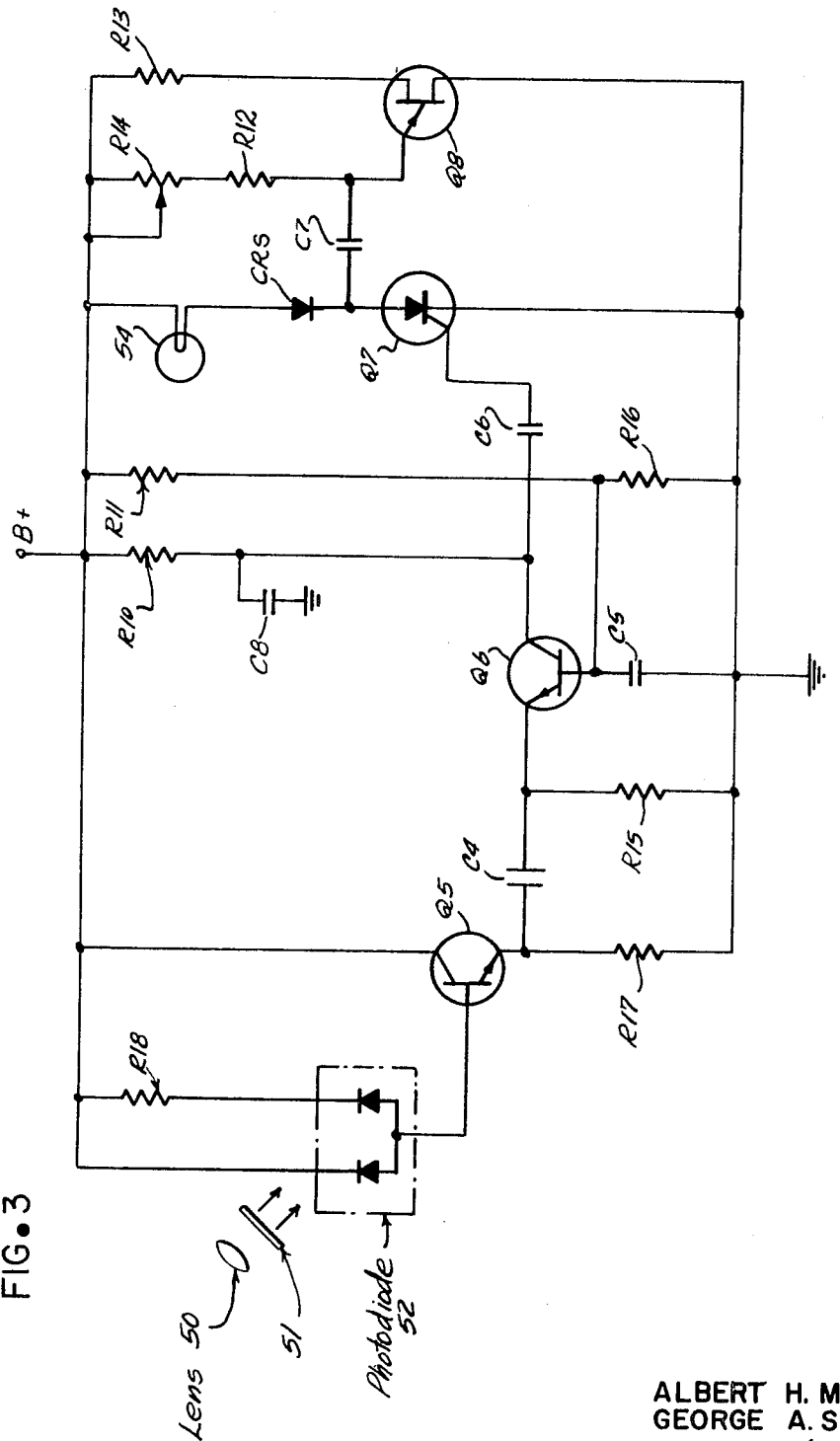

{ 3,657,826 }

SEMICONDUCTOR LASER MARKSMANSHIP TRAINING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention is in the field of marksmanship training devices. Since the invention of the laser numerous efforts have been made to devise marksmanship training devices utilizing the laser's coherent light beam. These efforts have met with some success, particularly in larger devices such as artillery, naval and tank gun simulators where the weight and power requirements of conventional lasers are not seriously detrimental and reasonable precautions can be taken to protect the eyes of using personnel from exposure to the laser beam. However, the weight, size, danger, and power requirements of ordinary lasers have heretofore precluded the development of a safe and practicable laser based device suitable for small arm training. The invention overcomes these deficiencies of the prior art by providing a safe, practicable, laser-based small arms training device.

SUMMARY OF THE INVENTION

The invention comprises a novel transmitter and receiver built into a simulated rifle (or other weapon) and a target respectively which utilize the unique capabilities of the semiconductor laser. The transmitter circuit pulses a gallium arsenide laser diode. The laser beam pulses which are transmitted from rifle to target are invisible and safe to the human eye. The receiver located at the target is uniquely sensitive to the laser beam and does not respond to ambient light. The device functions in bright daylight. The power required to drive the circuitry is minimal compared to that required by prior art devices. A small self-contained battery will operate the system for a useful period. The rate of fire of the simulated weapon can be adjusted to any desired rate from single-shot to very high rates so that one basic system can be used for several different simulated weapons. For example, rifles, pistols, rapid fire cannon, and machine guns having very high cyclic firing rates can be simulated. The number of shots fired in a single burst can be adjusted to simulate the operation of weapons with magazines of various capabilities. A collimating lens can be moved with respect to the laser to adjust the divergence of the beam to simulate the spreading shot pattern of weapons such as shot guns.

BRIEF DESCRIPTION OF THE DRAWINGS

FIG. 1 shows the invention;
FIG. 2 is a circuit schematic of a transmitter;
FIG. 3 is a circuit schematic of a receiver; and
FIG. 4 is a graph of wavelength vs transmission times absorption.

DESCRIPTION OF THE PREFERRED EMBODIMENT

FIG. 1 shows the physical appearance of a typical application of the invention. A replica 1 of a current weapon, for example an M-16 rifle, is made up to house the transmitter 4 of the invention. The transmitter is so arranged that when a trigger switch 30 of gun 1 is closed, a laser beam 5 is projected through a collimating lens 6 in a direction parallel to the barrel of the weapon. A target 2 may be of any desired configuration and may contain one or more receivers 3. For military use the targets typically are shaped to represent a human torso and may contain receivers at positions representing vulnerable parts of the body.

If the gun 1 is aimed properly at target 2, one of the receivers 3 will be struck by the laser beam, thus energizing a receiver circuit to actuate a signal device.

FIG. 2 is a circuit schematic of the transmitter of the invention shown in FIG. 1. The transmitter is comprised of a trigger control circuit, a pulse generator, and a modulator. When the trigger switch 30 is closed by a trainee to "fire" gun 1, a previously conducting transistor Q1 ceases to conduct for an interval determined by the values of an adjustable capacitor C3 and a resistor R2. When Q1 ceases to conduct a capacitor C2 is charged through a resistor R3 until the emitter of a unijunction transistor Q2 reaches a voltage sufficient to cause Q2 to conduct. Q2 conducts to discharge C2 across a resistor R9. When the emitter voltage of Q2 falls to about 0.2 volt the emitter ceases to conduct and the cycle is repeated. The voltage developed across R9 is applied through a diode CR1 to fire a silicon controlled rectifier (SCR) Q3. When Q3 is fired a capacitor C1 discharges through three parallel connected isolating diodes CR2, CR3, and CR4 and a gallium arsenide laser diode 14 which generates a laser beam which may be aimed at target 2. When SCR Q3 fires the voltage drop across a resistor R6 connected in series with Q3 and 14 causes a bipolar transistor Q4 to conduct. Since Q4 is connected in a low resistance path in parallel with Q3 conduction in Q4 short circuits Q3 and Q3 ceases to conduct. C1 recharges and Q4 ceases to conduct. This condition prevails until Q3 is fired again by a pulse from oscillator Q2.

Q1 provides an output voltage to Q2, the period of which can be varied by adjusting C3 and/or R2. Q2 will oscillate generating a pulsed output signal during the time that Q1 is not conducting at a frequency determined by the values of C2 and R9 which can be adjusted as desired. Thus the circuit can be adjusted to fire at a predetermined rate for a predetermined length of time. The gun 1 can therefore be set to fire a single "shot" at each pull of the trigger 30 to simulate a typical semiautomatic rifle firing single shots one at a time, or to fire a burst at each pull of the trigger to simulate a typical submachine gun. Gun 1 may be adjusted to fire at any selected cyclic rate to simulate any domestic or foreign automatic weapon. This versatility makes it possible to use the invention in any infantry, artillery, or other simulated firearm, from small pistols to the largest cannon and rocket guns.

Another advantage of applicant's invention is that simulated weapons embodying the invention can be "boresighted" in a manner analogous to that employed to align the sights by boresighting conventional weapons. This is accomplished by continuously pulsing the laser in the manner described and viewing the beam with a night vision device. Gallium arsenide diodes presently available are over 100 times as efficient as the gas and ruby lasers of the prior art. Improved diodes now coming into production use even less power and have lower voltage requirements. Such diodes will make it possible to operate the invention without stepping up the battery voltage as shown in FIG. 2.

FIG. 3 shows the receiver circuits used in the invention. A target such as target 2 may have one or more receivers such as 3. Each receiver is comprised of a lens 50 and a band pass filter 51 through which the laser beam passes to impinge on a silicon diffused photodiode 52. Photodiode 52 has a rise time of 4 nsec. and a bandwidth of 100 MHz. A large bandwidth detector is required because of the short laser output pulse width of less than 200 nsec.

When a filtered laser beam strikes photodiode 52 an increased current flow through 52 results in a voltage which is applied to the base of a transistor Q5 which is connected in an emitter follower configuration. A voltage output pulse from Q5 is applied to the emitter of a transistor Q6 which amplifies the pulse and applies it to the gate terminal of an SCR Q7 to cause Q7 to conduct. Q5 is required as an impedance matching device between 52 and Q6. SCR Q7 is connected in series with an isolating diode CRS and "hit" indicating light 54 which lights when Q7 conducts. If desired light 54 may be replaced with any other kind of signalling device. The anode of Q7 is connected through a capacitor C7 to the emitter of a unijunction transistor Q8. When Q7 conducts C7 charges to a voltage which turns Q8 on. When Q8 conducts Q7 is short circuited to turn off and extinguish indicating light 54. A potentiometer R14 in series with resistor R12 between B+ and the emitter of Q8 is provided to adjust the length of time that indicating light 54 is "on" after each "hit."

The novel transmitter and receiver circuitry described hereinbefore result in unique advantages over the prior art such as compactness, light weight, economy, long battery life, etc. However, the principal advantage and a primary necessity which engendered the invention is safety. In military training devices the problems of safety are aggravated by the youth and inexperience of trainees. Serious eye injury and blindness can result from accidents with prior art laser devices. Therefore a weapon simulator which could take advantage of the laser's qualities and yet be safe for general use was badly needed.

The eye injuries possible with prior art lasers are caused by laser energy entering the eye and being focused by the lens to an extremely high energy density on the retina, causing a permanent burn-spot. The threshold power level at which biological damage to the eye can occur has been determined. The following table shows the eye damage threshold values of power from a non-Q-switched laser.

TABLE

Non-Q-Switched Laser

Safety Levels

| pulse length | 1 nanosec to 0.1 second |
| PRF | less than 10 |
| --- | --- |
| Daylight | |
| 3 mm pupil | $5.0 \times 10^{-7}$ (joules/cm$^2$) |
| Laboratory | |
| 5 mm pupil | $2.0 \times 10^{-7}$ (joules/cm$^2$) |
| Night | |
| 7 mm pupil | $1.0 \times 10^{-7}$ (joules/cm$^2$) |

The table shows the power in joules-per-square-centimeter tolerable to the retina under common conditions of lighting and eye pupil distension. This table was derived from experimental work on animals using a non-Q-switched laser radiating at a wavelength of G943A with pulse widths of 1 nsec. to 0.1 sec. and a pulse repetition frequency of less than 10. FIG. 4 shows a quantity of "transmission times absorption" used in determining damage thresholds, plotted against wavelength. The gallium arsenide diode lasers used in applicants' invention emit at a wavelength of 9050A. Therefore as shown by the curve of FIG. 4, a laser beam from applicants' transmitter will be less dangerous to the eye than the radiation on which the proceding table is based.

The formula used in calculating permissible laser power without reaching the damage threshold is $$\text{Joules/cm}^2 = \frac{\text{watts peak power} \times \text{pulse width (50\% pts.)}}{\text{area of laser beam}}$$

Applicants' invention has a laser output power of 4 watts peak at the surface of a 3 cm diameter lens used to collimate the beam which is slightly divergent as emitted. The pulse length is a maximum of 100 nsec. Therefore the laser power output of applicants' novel transmitter is $$\frac{4(100) 10^{-9}}{\pi(1.5)^2} = 5.6 \times 10^{-8}$$

Joules per square centimeter. This is considerably less than the $1 \times 10^{-7}$ Joules per square centimeter damage threshold for the worst conditions shown in the table when the pupil of the eye opens to 7 mm under night conditions. Thus a trainee will not suffer eye damage if during a night training exercise, he looks directly into the collimating lens of applicants' gun 1, the worst possible situation from the standpoint of safety. This safety is contingent on keeping the firing rate below 10 pulses per second which is sufficient to simulate the firing rate of most machine guns.

Another advantage of the invention is low power consumption. Conventional laser training devices have high power requirements, necessitating large and heavy power supply means. For example most conventional lasers have efficiencies of only fractional values of 1 percent. The gallium arsenide semiconductor laser used in the invention has an efficiency of around 10 percent. Therefore a lightweight rechargeable battery installed in gun 1 will supply sufficient power to fire thousands of rounds, equivalent to days of use, without recharging. Thus the simulated weapons used in applicants' invention are truly portable.

Applicants' unique transmitting circuit together with the qualities of the selected semiconductor laser diode 14 make it possible to safely simulate the firing characteristics of any known firearm. First by adjusting resistor R3 and/or capacitor C3 the trigger control circuit comprising Q1 can be adjusted so that gun 1 will fire a single "shot" each time trigger switch 30 is closed to simulate a semiautomatic rifle or pistol firing one shot at a time, or the period of Q1 can be adjusted so that gun 1 will fire a selected number of rounds and stop. This makes it possible to simulate burst firing of automatic weapons. Any particular weapon or weapon magazine capacity can be simulated. For example some weapons may utilize ammunition magazines of different capacities, for example magazine clips of 5, 15, or 30 rounds. Any of these can be accurately simulated. The firing characteristics of machine guns which have magazines or belts holding hundreds of rounds of ammunition can be accurately simulated.

Another salient advantage of the invention lies in the capability of adjusting the firing rate of gun 1 by adjusting the oscillating frequency of Q2 by adjusting R3. This makes it possible to accurately simulate the firing rate of any automatic weapon from fast firing machine guns to relatively slow firing heavy guns such as anti-aircraft cannon.

What is claimed is:

1. In a marksmanship training device having a laser beam gun and a laser responsive target, the improvement comprising
   a laser beam transmitter incorporated in said gun, said transmitter including,
   a power supply,
   a trigger control circuit connected to said power supply,
   a pulse generator connected to said trigger control circuit,
   a modulator connected to said pulse generator,
   a laser connected to said modulator,
   said modulator being adapted to pulse said laser in response to a gating pulse from said pulse generator,
   said modulator including a capacitor for storing a charge from said power supply and gate means for discharging said capacitor through said laser when a gating pulse is received from said pulse generator,
   said pulse generator being adapted to supply one or more gating pulses to said gate at a predetermined rate in response to an actuating pulse from said trigger control circuit,
   said pulse generator including adjusting means for selectively adjusting the rate at which gating pulses are supplied to said gate.

2. The apparatus of claim 1, said trigger control circuit including a trigger switch for initiating said actuating pulse from said trigger control circuit and adjusting means for selectively varying the duration of said actuating pulse.

3. The apparatus of claim 2, said trigger control circuit comprising a normally conducting transistor adapted to cease conduction in response to closure of said trigger switch to thereby initiate an actuating pulse for actuating said pulse generator, an adjustable RC circuit connected to the base of said transistor, said RC circuit being adapted to cause said transistor to resume conduction after period determined by the adjustment of said RC circuit to thereby terminate said actuating pulse.

4. The apparatus of claim 3, said pulse generator comprising a unijunction transistor oscillator, said oscillator being adapted to oscillate for the duration of said actuating pulse to thereby transmit one or more gating pulses to said modulator, and adjustable means for controlling the frequency of said oscillator and thus the frequency of said gating pulses.

5. The apparatus of claim 4, said modulator comprising a silicon controlled rectifier connected to conduct when gated by said gating pulses, a capacitor connected between said power supply and ground, said capacitor being connected to discharge through said laser when said rectifier conducts and to recharge when said rectifier is nonconducting.

6. The apparatus of claim 5 and including commutating means for cutting off said rectifier after said rectifier conducts for a predetermined period.

7. The apparatus of claim 9, and including a receiver, said receiver comprising a lens, a band pass filter, and a photodiode, said photodiode being connected to said power supply and adapted to generate an output pulse when struck by a laser beam passing through said lens and said filter, a silicon controlled rectifier, impedance matching and amplifying means connecting said photodiode to said rectifier whereby said rectifier is turned on to generate a signal pulse when said photodiode generates an output pulse, and indicating means responsive to said signal pulse.

* * * * *